Jan. 6, 1948.    E. B. HAMMOND, JR., ET AL    2,433,843
FIXED GUN INTER-AIRCRAFT FIRE CONTROL SYSTEM
Filed Oct. 17, 1942    4 Sheets-Sheet 1
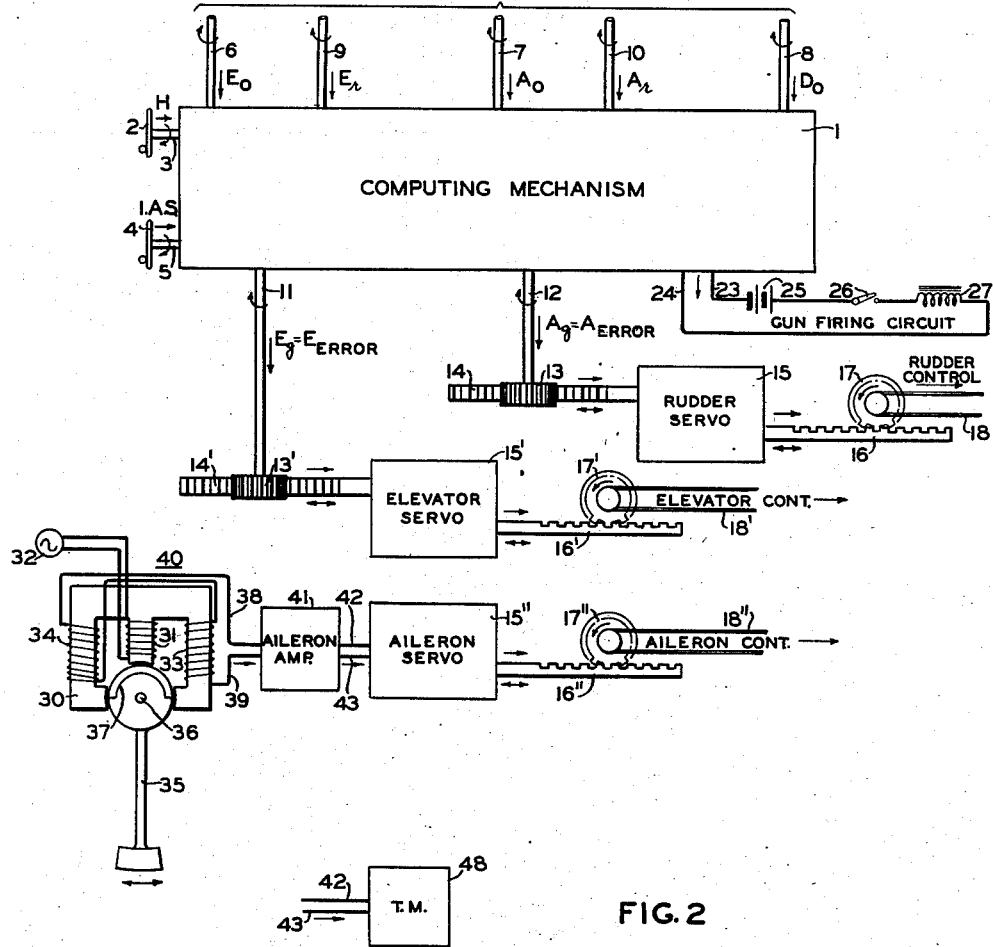
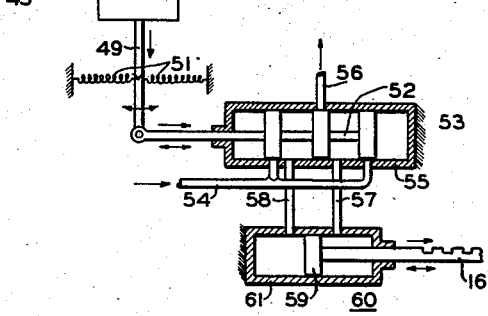
INVENTORS:
E. B. HAMMOND JR.
G. E. WHITE
BY
ATTORNEY Jan. 6, 1948.     E. B. HAMMOND, JR., ET AL     2,433,843
FIXED GUN INTER-AIRCRAFT FIRE CONTROL SYSTEM
Filed Oct. 17, 1942     4 Sheets—Sheet 2
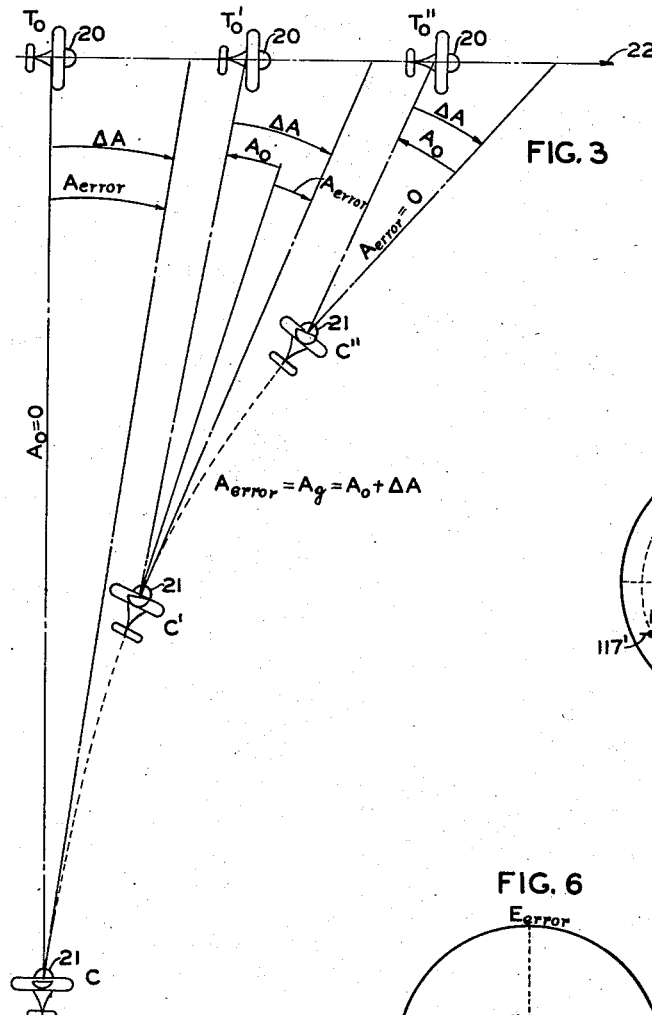
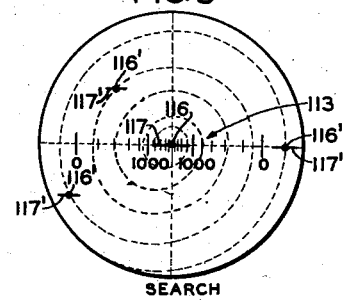
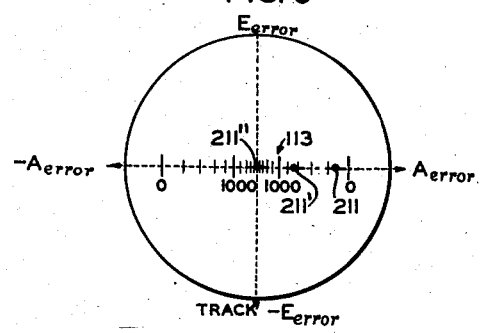
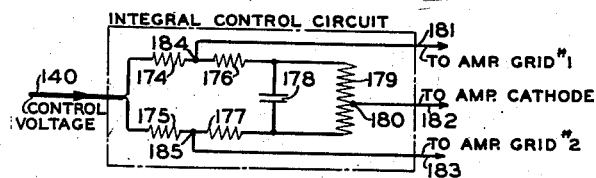
INVENTORS:
E. B. HAMMOND JR.
G. E. WHITE
BY
ATTORNEY

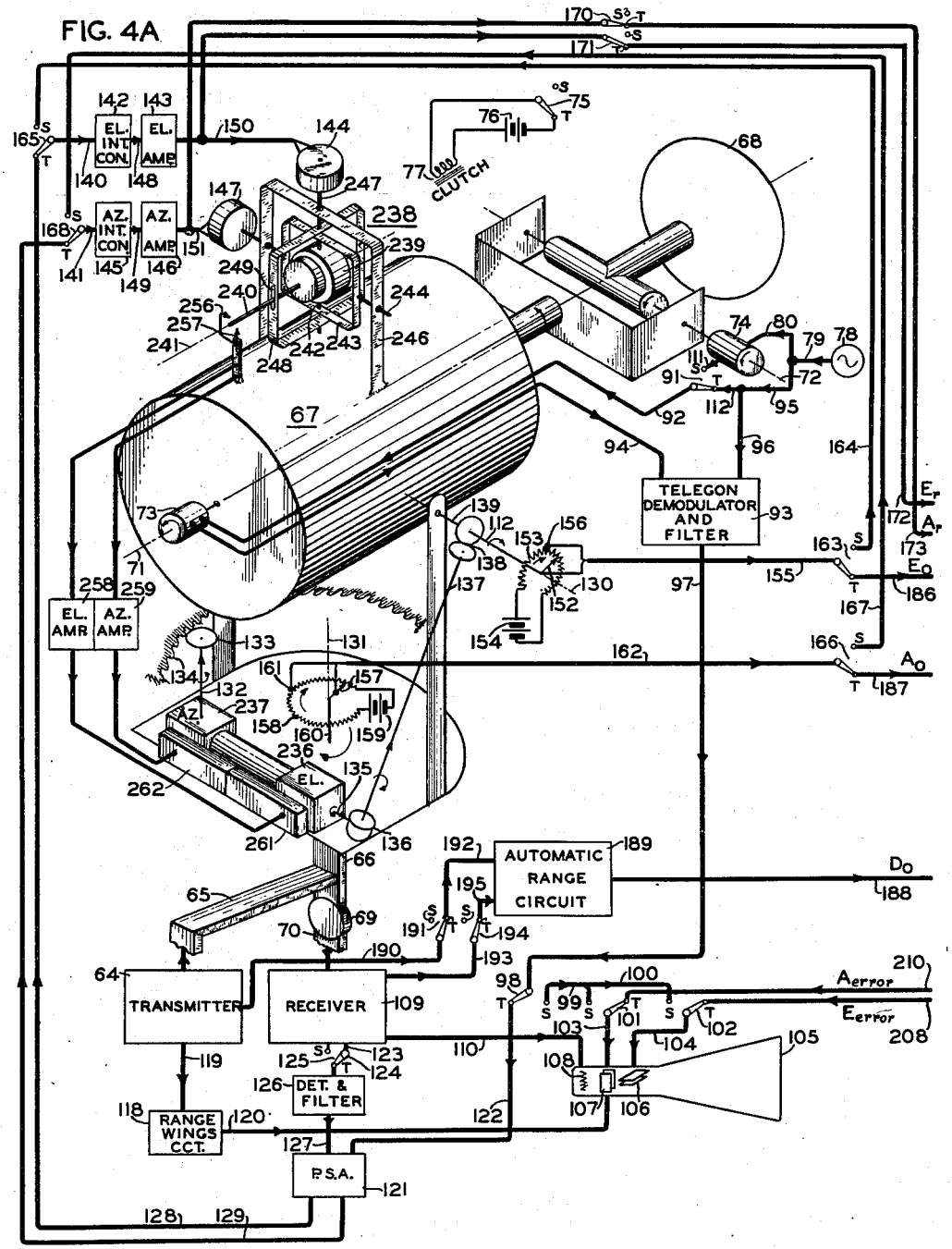

Jan. 6, 1948.     E. B. HAMMOND, JR., ET AL     2,433,843
FIXED GUN INTER-AIRCRAFT FIRE CONTROL SYSTEM
Filed Oct. 17, 1942     4 Sheets-Sheet 4
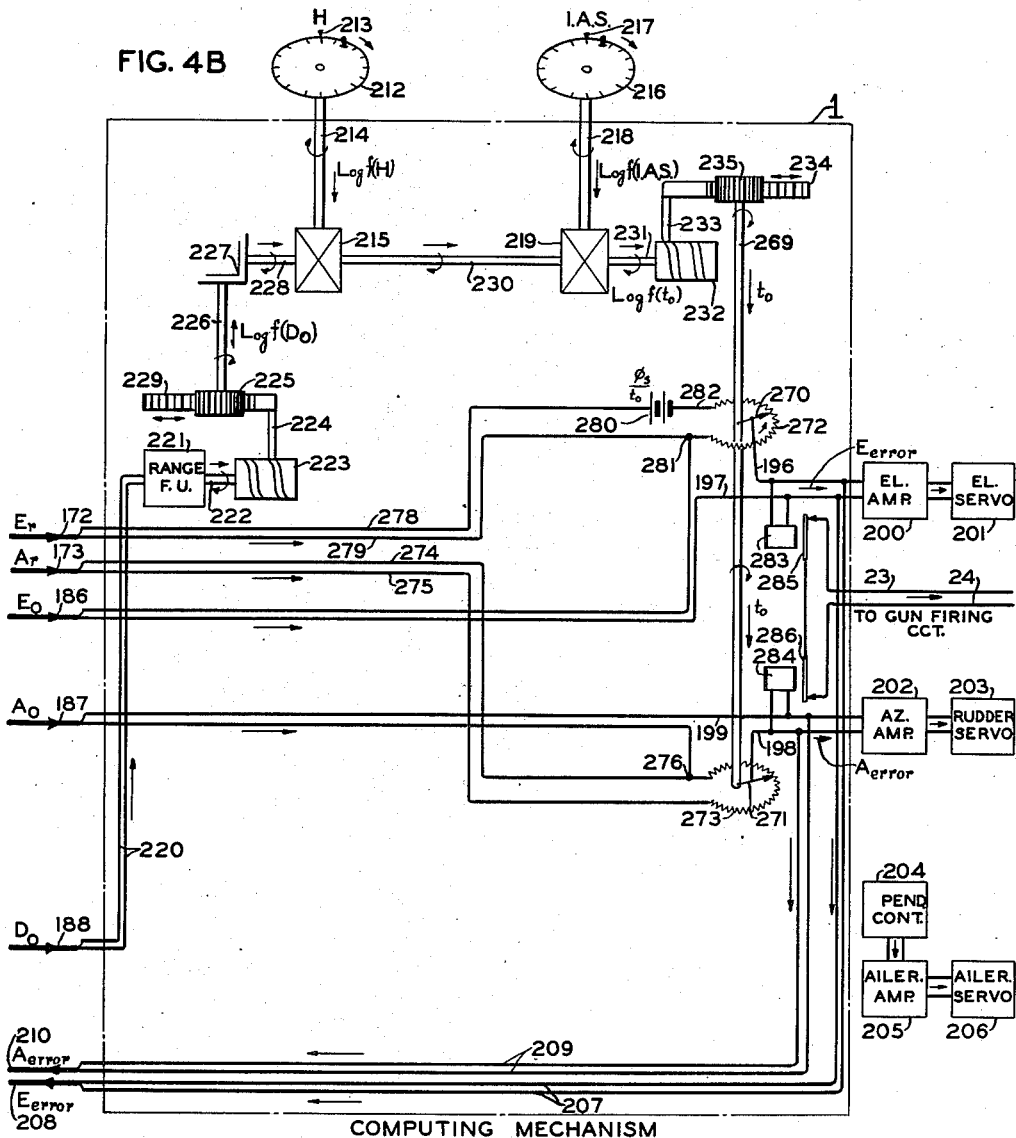
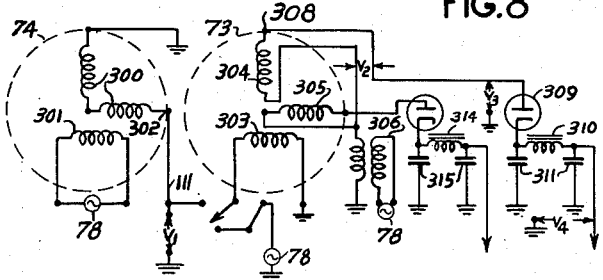

Patented Jan. 6, 1948

2,433,843

UNITED STATES PATENT OFFICE 2,433,843

FIXED GUN INTERAIRCRAFT FIRE CONTROL SYSTEM

Edmund B. Hammond, Jr., Brooklyn, and Gifford E. White, Hempstead, N. Y., assignors to Sperry Gyroscope Company, Inc., Brooklyn, N. Y., a corporation of New York Application October 17, 1942, Serial No. 462,440

28 Claims. (Cl. 89—37.5)

The present invention is concerned with inter-aircraft fire control apparatus especially adapted for use on fighter or interceptor aircraft which carry fixed guns, that is, guns whose line of fire is always fixed and parallel with respect to the craft axis.

Presently used inter-aircraft fire control systems for such fixed gun aircraft are very elementary, comprising merely an optical sight whose axis is normally parallel with respect to the gun and craft axis. A rough correction for superelevation is obtained by slightly offsetting the sight axis with respect to the gun axis in elevation, the amount of offset being manually varied in steps according to the range.

Since no computation of lead angle is made, it is not sufficient that the target be visible to the pilot in his sight; it is also necessary that the lead angle, if one were computed, be substantially negligible. It is apparent that this condition obtains only when the range, and consequently the time of flight, are very small, or when the pilot is on the target's tail, that is, the line of sight is parallel to the direction in which the target is moving. To meet the first of these conditions, the pilot is required to fly his plane in dangerously close to the target. To meet the second alternative condition, a large period of time, amounting to several minutes, is generally consumed after the target has first been sighted.

This same system, described above, is adapted to night flying by the provision of suitable radio locating and position finding apparatus, which replaces the optical sight and performs essentially the same functions. It is adapted to locate a target and provide indications on a cathode ray tube indicator screen of the target's azimuth, elevation and slant range with respect to the plane. The pilot may then fly the plane until zero azimuth and elevation are indicated. If, at this time, the indicated slant range is sufficiently small, or if the zero indications of azimuth and elevation may be maintained while flying his own plane at constant attitude (the target is then flying at constant attitude and his own craft is on its tail), he may fire and expect a hit. Thus, the previously known system is even more difficult to use at night.

By the present invention it is proposed to overcome these disadvantages by providing a suitable computing system so that the proper lead angle for accurate fire may be automatically obtained, thus overcoming the necessity of the pilot meeting the conditions that the lead angle be negligible, and allowing him to fire quickly after sighting the target, and at a distance limited only by the range of his guns.

Inter-aircraft computers for flexibly or rotatably mounted guns are available, which indicate the correct gun aiming angles with respect to the craft at which the guns must be positioned to effectively fire at the target. Such computers have heretofore been used only on aircraft whose guns are orientable with respect to the ship in elevation and azimuth. Obviously, on fixed gun aircraft, it becomes impossible to orient the guns with respect to the craft in accordance with the computed gun elevation ($E_g$) and gun azimuth ($A_g$) angles, since, the guns are fixed on the craft parallel to the craft axis, so that these angles are fixed at zero.

In the present invention it is proposed to compute these angles, and then fly the craft in such a manner as to reduce them to zero. When these computed angles are zero, the craft and guns are properly oriented to effect a hit. Since, in the case of fixed gun aircraft the actual gun elevation ($E_g$) and gun azimuth ($A_g$) angles must always be zero, it is better to consider the corresponding computed angles as elevation error ($E_{error}$) and azimuth error ($A_{error}$) angles, and as representing the angular displacement between the actual orientation of the craft and the computed orientation necessary to effect a hit.

In one embodiment of the present invention a simplified computing mechanism is disclosed which is adapted to be used on fighter and interceptor aircraft. The invention is also described in connection with a known completely orientable and stabilized radio sight and a radio position and direction finding system which is adapted to automatically and instantaneously supply the required data input to the computing mechanism. The invention also comprises an automatic pilot system, whereby the plane may be automatically flown in such a manner as to reduce the computed elevation and azimuth error angles to zero.

Accordingly, the principal object of the present invention is to provide an automatic inter-aircraft fire control system adapted for use on aircraft carrying fixed guns.

Another object of the invention is to provide a completely automatic pilot servo system adapted to fly an aircraft carrying fixed guns in accordance with computed signals in such a manner that the craft (and the guns) will be correctly oriented for effective gun fire.

Still another object of the invention is to provide a simple computing system especially adapted for use on fighter or interceptor aircraft.

A still further object of the present invention is the provision of an automatic firing circuit, whereby the gun can be fired only when the problem is correctly solved, that is, when the craft and the gun are correctly oriented to effect a hit.

An object of the invention is to provide an automatic and stabilized radio-operated inter-aircraft fire control system for use on aircraft carrying fixed guns.

Other objects and advantages will become apparent from the specification taken in connection with the accompanying drawings, wherein one embodiment of the invention is illustrated.

In the drawings,

Fig. 1 is a schematic representation of one embodiment of the present invention.

Fig. 2 is a schematic diagram of a detail of Fig. 1.

Fig. 3 is an illustration useful in explaining the theory of operation of the invention.

Figs. 4A and 4B, taken jointly, show a schematic representation illustrating an embodiment of the system of the invention.

Fig. 5 shows a representative view of the screen of the cathode ray indicator tube of Fig. 4A during search.

Fig. 6 shows a representative view of the screen of the cathode ray indicator tube of Fig. 4A during track.

Fig. 7 is a wiring diagram of the integral control units shown schematically in Fig. 4A.

Fig. 8 is a wiring diagram of a demodulator and filter circuit.

Similar characters of reference are used in all of the above figures to indicate corresponding parts. Arrows are used to indicate the direction of flow of information.

Fig. 1 illustrates an embodiment of the invention utilizing a computing mechanism 1, which may be of any suitable type for computing lead angles, such as those of the well known "K" series of sights widely used by the armed forces. Other types of computers may be adapted for use in connection with the present invention, such as those disclosed in the following patents: Patent No. 2,105,985, issued January 18, 1938, to Papello; Patent No. 1,638,962, issued August 16, 1927, to Schneider; Patent No. 1,849,611, issued March 15, 1932, to Bussel; Patent No. 1,481,248, issued January 15, 1924, to Sperry; and Patent No. 1,308,134, issued July 1, 1919, to Wilson et al. The various computers referred to are adapted to compute the lead angle at which the gun must be offset from the line of sight in order that projectiles therefrom may strike a moving target. Generally, when the sight of a computing gun sight of the kind referred to is displaced in tracking a target, the computer is actuated by the sight or the sight displacing means according to the changing azimuth and elevation angles of the target. Depending on the type apparatus employed, the rate of change of these angles is determined either at the sight or within the computer, and multiplied by time of flight to obtain prediction components of the lead angle in azimuth and elevation, and to these components are added corresponding ballistic deflections, computed within the computer to obtain total lateral and total vertical deflections. Computers of the kind referred to are usually provided with separate output shafts displaced respectively by the computing mechanism according to total lateral and total vertical deflections. Depending on the particular arrangement of the apparatus, these outputs may be used to modify the position of the guns or of the sight, the object being to effect relative displacement of the guns and line of sight, so that the guns "lead" the line of sight according to the computed lead angle. It is proposed in the present invention to use the outputs of a lead angle computer as an aid or as controls to fly a supporting aircraft having fixed guns to a position wherein the guns are positioned in elevation and azimuth according to the lead angle computed by a computer. Such an arrangement is shown diagrammatically in Fig. 1.

At this point, the computing mechanism indicated by the oblong 1 will be considered as having but three input shafts, of which shafts 6 and 7 are displaced respectively by a sight, not shown, during target tracking according to the instantaneous elevation angle $E_0$ and the instantaneous azimuth angle $A_0$. Shaft 8 is displaced manually or otherwise according to slant range, $D_0$, obtained from a range finder, not shown.

The computing mechanism which may be of a type disclosed in any of the above-mentioned patents or in any of the more recently developed computing gun sights, such as the "K" series of sights referred to above is adapted to produce on suitable output shafts 11 and 12, respectively, angular displacements corresponding to the gun elevation angle ($E_g$) and gun azimuth angle ($A_g$) with respect to the craft at which the guns must be positioned in order to effect a hit.

As previously pointed out, in aircraft carrying fixed guns, the guns are not susceptible of being positioned in accordance with these computed angles, but, in fact, are fixed so that the actual gun elevation and gun azimuth angles ($E_g$, $A_g$) must always remain zero. Therefore, it is better, in a fixed gun system, to consider these angles as elevation error angle ($E_{error}$) and azimuth error angle ($A_{error}$), and as representing the angular displacement between the present attitude of the craft (and the guns) and the correct attitude of the craft (and the guns) required to effect a hit on the target. Henceforth, in this discussion the computed gun elevation angle ($E_g$) and computed gun azimuth angle ($A_g$) will be referred to as elevation error angle ($E_{error}$) and azimuth error angle ($A_{error}$), bearing in mind that they are, in reality, identical, the change in terminology merely representing a change in viewpoint better adapted to a fixed gun fire control system.

The computed azimuth error angle ($A_{error}$) signal, which appears as a proportional angular displacement of output shaft 12, is transmitted to the rudder servo 15, as by pinion 13 and input rack 14. Rudder servo 15 may be of the type shown in Fig. 2, to be further described in detail, or may be of any other suitable type adapted to produce a velocity of output rack 16 proportional to the displacement of input rack 13. The resulting motion of output rack 16 is then transmitted by pinion 17 and pulley system 18 to the rudder which thereby alters the azimuthal attitude of the craft, which in turn alters the present azimuth angle ($A_0$) input data to the computer in such a sense that a smaller azimuth error angle ($A_{error}$) will be computed. This process will continue until the computed azimuth error angle ($A_{error}$) is reduced to zero, which means that the craft (and the guns) is at the proper azimuthal attitude to effect a hit.

This process is more clearly illustrated in Fig. 3 in which the angular relations in azimuth for three successive stages in the process are shown. It will be assumed that the target 20 is flying at a constant velocity in the direction of the arrow 22, and that at the time that the above described system begins to operate, the target and craft occupy the positions T₀ and C, respectively, and the craft is flying along the line of sight 21—20, so that the present azimuth angle (A₀) is zero. The azimuth lead angle (ΔA) represents the angle at which the gun must be offset from the line of sight in azimuth in order to effect a hit, and is composed of prediction plus any ballistic correction, such as drift, which may be incorporated in the solution. The computing mechanism, having calculated azimuth lead angle (ΔA), then solves for the azimuth error angle (A_error) by the formula, A_error = A_g = A₀ + ΔA, and transmits this quantity to the automatic servo control system for the rudder.

The resulting movement of the rudder alters the azimuthal attitude of the plane in such a direction as to increase A₀ and to decrease A_error, as indicated in the second stage of the diagram, which illustrates the angular relations at an instant later when the craft is at the position C' and the target is at the position T₀'. The last stage, in which the craft is shown at position C" and the target at position T₀", indicates the angular relations at a still later time when this continuous process has finally reduced A_error to zero. The craft (and the guns) is now at the correct azimuthal attitude to effect a hit. It will be noted that at this time ΔA is equal and opposite to A₀.

The attitude of the plane is automatically positioned correctly in elevation in exactly the same manner. The computed elevation error angle (E_error) data is transmitted by shaft 11, pinion 13', and rack 14' to tlhe elevation servo, which then controls the elevator of the craft through the rack 16', pinion 17' and pulley system 18', in such a sense as to reduce the elevation error angle (E_error) to zero.

In Fig. 1 there is also shown an automatic gun firing circuit consisting of leads 23, 24, battery 25, firing key 26, and gun firing solenoid 27. It will be understood that there is included in the computing mechanism, and automatically operated thereby, two additional switches in series with the gun firing circuit, one for elevation and one for azimuth, each of which is closed only when the corresponding elevation and azimuth error angle is zero, with the result that the gun may only be fired when both error angles are zero, that is, when the problem is correctly solved and a hit will be effected. Such an automatic gun firing circuit will result in a saving of ammunition, and will make the pilot's task simpler, since he may, in this case, continually hold his firing key closed, and the gun will fire automatically only when the craft is correctly positioned to effect a hit.

There is also shown in Fig. 1 a servo control system which operates on the ailerons to provide the correct angle of bank for the craft while the attitude of the plane is being changed in azimuth. An inductive pick-off 40, which is adapted to sense the error in the angle of bank both in magnitude and direction, transmits this information, in the form of an alternating voltage across leads 38, 39, to the aileron amplifier 41, which may be of any well known type adapted to produce across its output leads 42, 43 a direct voltage corresponding in polarity and magnitude to the phase and amplitude of the input signal voltage 38, 39. The aileron servo 15" then operates on the ailerons under the control of signal voltage 42, 43 through rack 16", pinion 17", and pulley system 18" to provide the correct angle of bank.

The inductive pick-off 40 consists essentially of a fixed core 30 of some magnetic material, such as iron, and a suitably damped pendulous element 35. The coil 31 wound on the center leg of core 30 is excited from a constant source of alternating current 32. The coils 33 and 34 on the opposing outer legs of core 30 are wound oppositely on their respective legs and are connected in series, so that the voltage across leads 38 and 39 will always be the difference of the voltages induced in the coils 33, 34.

The pendulous element 35 is mounted symmetrically with respect to the three legs of the core 30, and is adapted to rotate about an axis 36 which is parallel to the longitudinal axis of the craft. Mounted on the pendulous element 35, and also symmetrically disposed with respect to the three legs of core 30, there is shown an arcuate member 37 of a suitable magnetic material, such as iron.

When the craft is operating at the proper angle of bank, the resultant of the gravitational force and the centrifugal force, which results from any turn in azimuth, is in a direction parallel to the normally vertical axis of the craft. When this condition obtains, the pendulous element 35, which will assume the same direction as the resultant force, and the magnetic member 37, will be symmetrically disposed with respect to the three legs of the core 30, which is fixed with respect to the craft. The reluctance of the two parallel paths of the magnetic circuit being then equal, equal fluxes will exist in both paths, with the result that the voltages induced in coils 33 and 34 will be equal and opposite, and no voltage will appear across the leads 38, 39.

However, if an incorrect angle of bank exists, the magnetic element 37 will be displaced from its symmetrical position with respect to core 30, and the reluctance of the parallel paths will be unequal. The voltages induced in coils 33 and 34 will therefore also be unequal, resulting in an alternating voltage across leads 38, 39, the magnitude and phase of which will represent in magnitude and sense the necessary correction to the angle of bank. The inductive pick-off 40 could be replaced by any suitable device capable of sensing the magnitude and direction of the necessary correction to the angle of bank and producing an output voltage proportional thereto.

Fig. 2 is an illustration of a suitable type of aileron servo which could be employed, although the present invention is not necessarily restricted to this type. As has previously been pointed out, the amplifier 41 is adapted to produce in its output leads 42, 43 a reversible polarity direct voltage. This voltage 42, 43 controls a suitable torque motor 48 of any conventional type adapted to produce an angular displacement of its output member 49 in a direction and of a magnitude corresponding to the polarity and magnitude of the control voltage 42, 43.

As shown, output member 49 may be centralized by suitable springs 51, which also assure a linear and proportionate type of control. Output member 49 is adapted to reciprocate the control piston 52 of a suitable control valve 53, which is supplied with hydraulic or pneumatic pressure from a suitable pump, as by a duct 54, and is connected to a return reservoir or sump by a duct 56.

Valve 53 is adapted to produce between its output ducts 57 and 58 a differential fluid pressure corresponding in sense and magnitude to the relative displacement between its piston 52 and housing 55. This differential pressure is led to a servo motor 60, having a movable piston 59 and a fixed housing 61. The differential pressure causes piston 59 to move, thereby causing rack 16'' to be displaced at a velocity proportional to the displacement of control piston 52, and therefore also proportional to the control voltage across leads 42, 43.

This same type of servo system may be used for the rudder servo 15 and for the elevator servo 15'. In this case, piston 52 of control valve 53 would be actuated directly by rack 13 or 13', as the case may be.

It will be understood, however, that the invention is not limited to the type of servo system described, nor to any specific type of computing mechanism. Any computing mechanism adapted to produce output signals corresponding to the elevation error angle (E$_{error}$) and azimuth error angle (A$_{error}$), and any servo system adapted to control the attitude of the plane in such a manner that these error angles are reduced to zero, may be employed.

If, for any reason, automatic servo control of the attitude of the craft is not desired, the elevation error angle (E$_{error}$) and the azimuth error angle (A$_{error}$) could be indicated on suitable indicators, and the pilot himself could manually fly the plane so as to reduce these error angles to zero, thus correctly positioning the craft.

In Figs. 4A and 4B there is illustrated another embodiment of the invention comprising a complete inter-aircraft fire control system. The system is adapted to two consecutive modes of operation as designated by the pilot through suitable switching means. In the first, or search, position of the switches a warning system of suitable type such as described in copending application Serial No. 441,188 for Radio gun control system, filed April 30, 1942, in the names of C. G. Holschuh, G. E. White, W. W. Mieher, and J. E. Shepherd provides a visual indication of the presence, relative direction, and approximate range of other aircraft in the vicinity. With this information available, the pilot may pick out the most dangerous target, and fly his craft along the line of sight of that target.

The pilot then switches to track position, which initiates the second mode of operation. In this position a radio sight which may be of the type disclosed in copending application Serial No. 444,152 of Holschuh et al., filed May 22, 1942, relating to a Stabilized tracking and fire control system, is utilized to automatically track with the designated target, and provide the computing mechanism with the necessary information relative to the target in the form of signal voltages. Stabilizing apparatus for gun sights is well known, a stabilizing system being disclosed in the German patent to Anschutz, Serial No. 616,248, August 1, 1935.

The novel electro-mechanical computing mechanism illustrated in Fig. 4B is adapted to receive this information electrically from the radio tracking system, and to have mechanically set into it data corresponding to indicated air speed (I. A. S.) and altitude (H) of the craft, and to calculate and transmit, in the form of signal voltage outputs, the elevation and azimuth error angles (E$_{error}$, A$_{error}$). These error angle data are then used to control suitable servo systems similar to those illustrated in Fig. 1, thus automatically positioning the craft to the correct attitude for effective gun fire. A visual indication of the elevation and azimuth error angles is also provided on the scanner of a suitable cathode ray indicator tube, so that the pilot may dispense with the servo system, if desired, and himself fly the craft at the correct attitude. Two relays are incorporated in the computing mechanism which automatically close two switches, which are connected in series with the gun firing circuit, when both the error angles are substantially zero, thus providing an automatic cut-out feature in the gun firing circuit.

In general, the heavy leads of Fig. 4A represent two or more conductors cooperating to carry information, whereas the lighter leads of Fig. 4B represent single conductors. The radio searching, tracking and indicating system is shown in Fig. 4A, and the computing and servo mechanisms are shown in Fig. 4B.

In Fig. 4A there is shown schematically an ultra high frequency radio transmitting and receiving and scanning system, which includes a transmitter 64 adapted to generate periodic pulses of ultra high frequency energy and to transmit them, as by wave guides 65 and 66, to a scanner 67. These high frequency pulses are then transmitted through suitable wave guides and rotating and stationary joints (not shown) to the directive antenna 68, which radiates them into space as electromagnetic energy, the greater portion of the energy being concentrated in a direction along the axis of the antenna 68. If, at the time a pulse is transmitted, there is a target in that direction, the target will reflect a portion of the transmitted energy, which energy will then be received by antenna 68, and transmitted to the receiver 109 through various wave guides and rotating and stationary joints (not shown), wave guide 66, T. R. box 69 and wave guide 70. T. R. box 69 is adapted to prevent the transmitted pulses of high energy content from feeding directly back into the receiver 109, but allows the received pulses of lower energy content to pass. The electron beam of the cathode ray tube 105 is placed under the control of the receiver 109, which, through lead 110, counteracts the normal off bias of the grid 108 whenever a pulse is received, and thus allows a spot to appear on the screen. The method of operation is well known in the radar art.

The scanner 67 may be of any suitable type, and preferably is of the kind adapted for search and tracking operations. Generally, such scanners comprise an antenna which is spun about a spin axis to project a narrow beam of radiant energy into space for tracking purposes. For searching, an additional nodding motion is imparted to the antenna about an axis disposed at right angles to the spin axis, the antenna then projects, in effect, a solid conical beam of energy, which may cover the greater part of a hemisphere. Mechanisms for actuating such antennas and selectively controlling the nodding motions thereof are well known and are not within the scope of the present invention so it is not thought necessary to describe here a specific antenna or the controls therefor. An antenna of a suitable type is described and claimed in Patent No. 2,410,831, issued November 12, 1946, to L. A. Maybarduk, W. W. Mieher, S. J. Zand and G. E. White. Searching and tracking operations of the scanner 67 shown in Fig. 4A are controlled by a switch 75 which when closed completes an energizing circuit from battery 76 through the winding of a clutch magnet 77. When the switch is open the scanner causes the antenna 68 to nod as it spins, by means, not shown, for searching. When the switch is closed, the antenna spins, the antenna being maintained very slightly offset from its spin axis for tracking purposes.

In track position, therefore, the scanner, in effect, concentrates on one small portion of the hemisphere, and performs a conical scanning about that portion. A suitable transmitting and receiving system is disclosed in the above-mentioned copending application Serial No. 441,188.

Two transmitters 73 and 74, connected respectively to the spin and nod axes, are driven in accordance with the spin and nod motions, respectively, and provide a time reference for these motions.

These transmitters are two phase generators of the self-synchronous type known commercially as "Selsyn," "Autosyn" or "Telegon" transmitters, shown in detail in Fig. 8. In search position, the nod telegon 74 is shown as energized by a constant source of alternating current 78 through leads 79 and 80. The nod telegon is adapted to produce on lead 111 a voltage of the same frequency as the source 78, but whose amplitude continuously varies in accordance with the nod angle.

This voltage on lead 111 is transmitted to spin telegon 73 through switch 91 and lead 92. Spin telegon 73 is adapted to produce in its output lead 94 two voltages of the source frequency, each of which is modulated with a spin frequency whose amplitude is proportional to the nod angle, the spin modulation frequencies being displaced 90° with respect to each other. These two voltages are suitably combined in telegon demodulator and filter 93 with a voltage received from the source 78 through leads 79, 95 and 96, in such a way as to produce in the output lead 97 two 90° phase displaced voltages of spin frequency and of an amplitude proportional to the nod angle. One of these voltages is applied to the horizontal deflecting plates 107 of the cathode ray indicator tube 105 through switch 98, lead 99, switch 101 and lead 103. The other voltage is applied to the vertical deflecting plates 106 through switch 98, leads 99 and 100, switch 102 and lead 104.

A suitable circuit for telegon demodulator and filter 93 is shown in Fig. 8 where a nod transmitter 74 is indicated as a two phase generator having its phase windings 300 connected in series to provide a single output. A single phase energizing winding is connected with alternating current source 78. One terminal of phase windings 300 is grounded while the opposite terminal 302 is connected by lead 111 to a contact of switch 91.

Spin transmitter 73 is shown in Fig. 8 as having an energizing winding 303 having one terminal connected to the lever of switch 91 and the other to ground. Corresponding terminals of the two phase windings 304 and 305 are connected to a terminal of the secondary of a transformer 306, the other terminal of the secondary being connected to ground. The primary of transformer 306 is energized by alternating current from the source 78. Terminal 308 of phase winding 304 is connected to the plate of a diode 309 whose cathode is connected to one conductor of circuit 97 through a filter circuit which includes choke coil 310 and condensers 311.

The output terminal 312 of phase winding 305 is connected to the plate of diode 313 of a similar demodulator and filter circuit. The cathode of diode 313 is connected through choke 314 to a second conductor of circuit 97. Suitable filter condensers 315 are connected at opposite ends of choke coil 314. The voltages flowing from the choke coils 310 and 314 are of spin frequency and displaced 90° in phase, their amplitudes being proportional to the nod angle as described above.

As is well known, when two voltages of equal frequency and amplitude, but displaced in phase 90° with respect to each other, are applied to the horizontal and vertical plates, respectively, of a cathode ray tube, the electron beam is caused to trace out a circle on the screen of the tube, the radius of which circle is proportional to the amplitude of the two voltages. In the present case, however, the electron beam, if it were on, would be caused to trace out a spiral, since the amplitude of the two voltages is linearly varying in accordance with the nod angle. This spiral is in phase with, and corresponds to, the spiral scanning performed by scanner 67 during search.

However, as previously explained, the electron beam is only allowed to operate at the time that a pulse is being received. Therefore, a dot will appear on the screen of the cathode ray indicator tube 105 only at those points in the latent spiral corresponding to the instants at which a pulse is received. Fig. 5 illustrates a typical representation of the dots which might appear on the screen of the cathode ray indicator tube 105 during search. Thus, each of the dots 116, 116' represents a target, the orientation of whose line of sight with respect to the spin axis 71 corresponds in elevation and azimuth to the orientation of that particular dot with respect to the center of the screen of the cathode ray indicator tube. For instance, the dot 116 represents a target whose line of sight coincides with the spin axis 71.

A rough range indication is also provided on the screen of the cathode ray indicator tube 105 by the length of the lines 117, 117', the length bearing an inverse relation to the range. This rough range indication is obtained by superimposing upon the horizontal deflecting plates 107 a rapidly oscillating voltage 120, which is initiated at the time of the transmitted pulse and decreases in amplitude with time. Thus, the closer the target is, the shorter will be the time elapsed before the transmitted pulse is received, and the larger will be the oscillating voltage and the corresponding range wings 117, 117'. Such an oscillating voltage 120 is generated in the range wing circuit 118, which is energized from transmitter 64, as by lead 119. The required oscillating voltage is produced in lead 120 and is transmitted to the horizontal deflecting plates 107.

To more effectively use this rough range indication, a range scale 113 may be etched on the screen of the cathode ray indicator tube, as shown in Fig. 5. This range scale provides a more accurate indication of the range of a target, when its corresponding spot is at the center of the screen.

Thus, in search position, a visual indication is provided on the screen of the cathode ray indicator tube 105 of the approximate range of the target, and of the target orientation with respect to the spin axis 71 of the scanner 67.

When switch 91 is in track position, the nod telegon 74 is cut out of the circuit, and the spin telegon 73 is energized directly from the constant source of alternating current 78 through leads 79, 95, 112, and 92. The 90° phase displaced voltages of spin frequency produced in lead 97 are therefore of constant amplitude in this case. These voltages are fed into the phase sensitive amplifier 121, through switch 98 and lead 122.

During tracking operation, it has been seen that the antenna 68 performs conical scanning about a predetermined small area of the hemisphere. During track, therefore, a reflected pulse will be received corresponding to each transmitted pulse, and the envelope of these received pulses will vary at the spin frequency, the amplitude of the variation being proportional to the tracking error. The received pulses are fed through lead 123, switch 124 and lead 125 to the detector and filter 126, which is adapted to produce in its output lead 127 a spin frequency voltage corresponding to the envelope of the received pulses. This output voltage 127 is then also fed to the phase sensitive amplifier 121.

The phase sensitive amplifier 121, by comparing the phase of the voltage 127 with that of each of the reference voltages received on lead 122, is adapted to produce in its output leads 128 and 129 unidirectional voltages, each corresponding in magnitude and polarity to the magnitude and sense of the component of the voltage in lead 127 which is in phase with the particular reference voltage with which comparison is made. As is more fully explained in the aforesaid copending application Serial No. 441,188, these output voltage signals, appearing in leads 128 and 129, represent the elevation and azimuth components, respectively, of the tracking error, that is, the angular deviation of the line of sight of the target with respect to the spin axis 71. During tracking operations, the orientation of the spin axis is under the control of these voltages 128 and 129 so as to cause the scanner 67 to track with, or follow, the target, as will more fully be explained hereinafter.

Fixed to scanner 67 is a gyro 238 which comprises essentially a rotor (not shown) spinning within a rotor housing 239 about an axis 241. Housing 239 is pivotally mounted within a ring 243 perpendicular to axis 241. Ring 243 in turn is pivotally mounted within a further ring 246, fixed with respect to the scanner 67, for rotation about an axis 244, perpendicular to axis 242. Pivoted within ring 246 about an axis 247, perpendicular to axis 244, is a ball ring 248, containing an opening 249 through which passes a shaft 240 coaxial with the gyro axis 241. In this way the ball ring 248 is made to rotate about axis 247 together with the gyro axis 241.

The spin axis 71, of the scanner 67, which will hereinafter be referred to as the scanner axis, is orientable in elevation and azimuth with respect to the axis of the craft about the axes 130 and 131, respectively. The orientation of the scanner axis 71 is always maintained coincident with the orientation of the axis 241 of the gyro 238. For this purpose, suitable pick-offs, indicated schematically at 256 and 257, are provided which sense any relative displacement along two independent coordinates between the gyro axis 241 and the scanner orientation. The resulting voltages produced in pick-offs 256 and 257 are conducted through respective elevation and azimuth amplifiers 258 and 259 to the respective control circuits 261 and 262, thereby controlling the elevation and azimuth servos 236 and 237.

The output of the azimuth servo 237, which appears as a mechanical rotation of shaft 132, rotates the scanner 67 in azimuth through the interaction of gear 133 and fixed internal gear 134, only partly shown. The elevation servo output, which appears as a mechanical rotation of shaft 135, is transferred through gearing 136, shaft 137 and gearing 138 to the shaft 139, thereby rotating the scanner in elevation. Resulting motion of the scanner 67 in elevation and azimuth will be in such a direction that the scanner axis 71 will align itself with the gyro axis 241. The follow-up system just described should be made very quick acting, so that the scanner axis 71 will maintain coincidence with the gyro axis 241 even during rapid changes in the attitude of the craft.

The orientation of the gyro axis 241, in turn, is placed under the control of the elevation and azimuth signal voltages in leads 140 and 141, respectively. The elevation signal voltage 140 is led to an elevation integral control circuit 142, which will later be described more fully. The output voltage 148 is then led through a suitable amplifier 143 and then, by lead 150, to a torque motor 144, which is adapted to apply a torque to ball ring 248 about axis 247, the torque so applied corresponding in magnitude and sense to the magnitude and polarity of the elevation control voltage 148. The torque thus applied to ball ring 248 is transferred to the gyro axis 241 by means of the shaft 240, thereby creating a corresponding torque on the gyro rotor about axis 242. This torque, as is well known, will create a precessing motion of spin axis 241 about the perpendicular axis 244, which motion thereby corresponds to a motion of the gyro axis 241 in elevation.

In a similar manner, the azimuth signal voltage appearing in lead 141 is led to the azimuth integral control circuit 145. The output of this circuit is conducted by lead 149, through the azimuth amplifier 146, and then, by lead 151, to the azimuth torque motor 147, which is adapted to create a torque on ring 243 about axis 244. This torque, therefore, creates a precessing motion of gyro axis 241 about axis 242. This motion corresponds to motion of gyro axis 241 in slant plane azimuth.

Thus, it is seen that the scanner axis 71 is constantly maintained coincident with the orientation of gyro axis 241, and the orientation of the gyro axis 241, in turn, is placed under the control of the elevation and azimuth signal voltages 140 and 141. Therefore, the scanner orientation is likewise controlled in accordance with the elevation and azimuth signal voltages 140 and 141.

Rotation of the scanner 67 about axis 130 effects a rotation through shaft 112 of a potentiometer contact arm 152 which rides on, and makes electrical contact with, a fixed circular potentiometer resistor 153. A constant direct current is caused to flow in resistor 153, as by battery 154. One conductor of lead 155 is connected to the mid-point of the resistor 153, which is also the point at which the arm 152 makes contact when the scanner is at zero elevation with respect to the plane. The other conductor of lead 155 is directly connected to the arm 152. In this way the voltage across the conductors of lead 155 always corresponds in magnitude and polarity to the magnitude and sense of the angular displacement in elevation of the scanner axis 71 with respect to the craft axis.

In an identical manner, rotation of scanner 67 about axis 131 effects a rotation of shaft 160 and potentiometer contact arm 157 which rides on, and makes electrical contact with, a second fixed circular potentiometer resistor 158, which is constantly energized from battery 159. In this case mid-point 161 is chosen so that arm 157 makes contact with it when the scanner 67 is at zero azimuth with respect to the plane. Thus output voltage 162 is always proportional to the angular displacement in azimuth of the scanner axis 71 with respect to the craft axis.

During search position of the switches, the elevation voltage 155 makes connection to the elevation signal voltage lead 140 as by switch 163, lead 164 and switch 165, and thus controls the orientation of the gyro axis 241 and the scanner axis 71 in elevation. Similarly, the azimuth voltage 162 is employed as the azimuth signal voltage 141, through switch 166, lead 167 and switch 168. Thus, during search, the elevation and azimuth voltages 155 and 162 are made to control the orientation of the gyro axis 241 and scanner axis 71 so as to maintain these axes always coincident with the axis of the craft. In other words, during search, the scanner is always pointed in the same direction as the craft.

Also, during search, as has been previously explained, the pilot is provided with a visual indication on the screen of the cathode ray indicator tube 105 (see Fig. 5) of the presence and relative positions of all the other craft in the forward hemisphere. He may then pick out the most dangerous target, and fly his own craft in such a manner as to bring the spot represented by that target to the center of the screen. In this manner the pilot aligns the craft axis with the line of sight. That is, he points the craft at the target.

Since, during search, the gyro axis 241 and the scanner axis 71 are maintained coincident with the craft axis by the control and follow-up system previously described, it is apparent that now all three axes, and also the line of sight, are identically oriented.

When this condition has been met, as indicated by the central position of the spot in Fig. 5, the pilot then switches to track operation of the system. At this time the angular relations of the craft and target are as shown in the first stage of Fig. 3. From this point on, the plane will be automatically controlled by the servo system so as to assume the proper position, as illustrated in the final stage of Fig. 3, to effect a hit.

In track position of switches 165 and 168, it can be seen that the orientation of the gyro axis 241 and the scanner axis 71 is no longer under the control of the elevation and azimuth voltages 155 and 162, but, instead, is placed under the control of the voltages 128 and 129 which, it has been seen, are proportional to the tracking error, that is, the angular difference in elevation and azimuth, respectively, between the orientation of the scanner and the line of sight. In this way the scanner axis 71 is made to track with, or follow, the target. Thus, in track position the gyro axis 241 and the scanner axis 71 and the line of sight are all maintained coincident by the control and follow-up system, their positions being in this case independent of the orientation of the craft itself.

As is more fully explained in previously mentioned copending application Serial No. 444,152, when the scanner is caused to track with the target in elevation and azimuth under the control of the precessing torques applied by torque motors 144 and 147, respectively, the signal voltages 150 and 151 applied to these torque motors are proportional in polarity and magnitude to the sense and magnitude of the angular rates ($E_r$, $A_r$) of the target in elevation and azimuth, respectively, with respect to the standard or reference of position. These voltages 150 and 151 may then be conducted through switches 171 and 170, respectively, to the elevation and azimuth angular rate ($E_r$, $A_r$) voltage signal leads 172 and 173, respectively, thus supplying this rate data to the computing mechanism shown in Fig. 4B.

Actually, the azimuth angular rate voltage signal 173 thus produced is proportional to the slant plane azimuth rate, whereas the true azimuth rate should be set into the computing mechanism. Although a correction could be incorporated in the computing mechanism to convert the slant plane azimuth rate to the true azimuth rate, the actual difference between the two is extremely small and can be neglected. This is particularly true in the present system, since, when the craft is correctly positioned, the elevation of the line of sight ($E_0$) with respect to the craft will be equal and opposite to the elevation lead angle $\Delta E$ (as illustrated in Fig. 3 for azimuth), which will ordinarily be very small.

It is desired to have the scanner 67 track accurately with the target, a condition which necessarily results in the voltages 128 and 129 being zero, and at the same time to have voltage signals existing in leads 150 and 151, in order to obtain rate data for the computing mechanism. For this purpose, the elevation and azimuth integral control circuits 142 and 145 are employed.

The elevation and azimuth integral control circuits 142, 145 are identical and may be of the type illustrated in Fig. 7 for elevation integral control. As there shown, the circuit consists of four resistors 174, 175, 176 and 177, respectively, placed in series with the control voltage 140. Across the last two resistors 176 and 177, there are placed in parallel a condenser 178 and a fifth resistor 179. Output conductor 181 is connected to tap 184 between resistors 174 and 176, and output conductor 183 is connected to tap 185 between resistors 175 and 177. The third output conductor 182 makes connection to the center tap 180 of the fifth resistor 179. The three output conductors 181, 182 and 183, respectively, comprise the input voltage signal 148 to the elevation amplifier, which, in this instance, would include two electron tubes operated in push-pull.

When a signal voltage first appears on control voltage lead 140, the condenser 178 is uncharged, and the output signal voltage across conductors 181 and 183 will be composed merely of the sum of the voltage drops across resistors 176, 179 and 177, and will therefore be proportional to the control voltage 140. However, if this condition is maintained for a short time, the condenser 178 will charge. Now, if the control voltage 140 is reduced to zero, the voltage across the condenser 178 will be maintained until it discharges through resistor 179, and this voltage will continue to appear as an output voltage across the conductors 181 and 183.

Thus, by choosing the proper circuit constants adapted to provide a suitable time constant for the circuit, it is possible to have an output control voltage appear in lead 148, which may be used to control the orientation of scanner 67, and to provide the necessary rate data for the computing mechanism, and still have practically no signal voltage appearing in lead 140, that is, no elevation tracking error. The azimuth integral control circuit 145 operates in the same manner so as to maintain an output voltage signal in lead 149 after the input control voltage 141 has been reduced to zero by the elimination of the azimuth tracking error.

The voltage signals 155 and 162 are indicative of the orientation of the scanner 67 with respect to the craft. Since, during track position of the switches, the scanner axis 71 is maintained coincident with the line of sight, the voltage signals 155 and 162 correspond in magnitude and polarity to the magnitude and sense of the elevation and azimuth angles, respectively, which the line of sight makes with respect to the craft, that is, to $E_0$ and $A_0$. The voltages 155 and 162, therefore, are connected through switches 163 and 166, respectively, to leads 186 and 187, thus supplying present elevation and present azimuth angle ($E_0$, $A_0$) voltage signals, respectively, to the computing mechanism.

Data corresponding to present range ($D_0$) is automatically introduced into the computing mechanism as a voltage signal appearing in lead 188. In order to obtain this range signal voltage 188, an automatic range circuit is employed. This automatic range circuit is preferably of the type disclosed in copending application Serial No. 434,403, for Pulse receiving systems, filed March 12, 1942, in the name of H. M. Stearns. Such a circuit, when supplied with information relative to the time of transmission of the pulse, as by lead 190, switch 191 and lead 192, and also with similar information relative to the time of receiving the corresponding reflected pulse, as by lead 193, switch 194, and lead 195, is adapted to produce, as on output lead 188, a unidirectional voltage, the magnitude of which corresponds to the target range ($D_0$).

Thus, the computing mechanism, shown in Fig. 4B, having received, as voltage signal inputs, all the necessary data for the complete solution of the inter-aircraft fire control problem, computes the elevation error angle ($E_{error}$) and the azimuth error angle ($A_{error}$), as will be hereinafter described in more detail, and produces this information as unidirectional voltage signals across the conductors 196, 197 and 198, 199, respectively.

The elevation error angle ($E_{error}$) voltage signal across leads 196, 197 is amplified in the elevation amplifier 200, and then fed to the elevator servo 201, which may be identical to the aileron servo illustrated in Fig. 2, thus controlling the elevators, and consequently the orientation of the craft in elevation, so as to decrease the elevation error angle ($E_{error}$) to zero.

Similarly, the azimuth error angle ($A_{error}$) signal voltage across the conductors 198, 199 is amplified in azimuth amplifier 202, and then fed to the rudder servo 203, which may also be identical to the aileron servo illustrated in Fig. 2, and which correctly orients the craft in azimuth by operating on the rudder so as to reduce the azimuth error angle ($A_{error}$) to zero.

The elevator servo 201 and rudder servo 203, operating under the control of the elevation and azimuth error angle ($E_{error}$, $A_{error}$) voltage signals 196, 197 and 198, 199, respectively, will thus correctly position the craft (and the guns) to the correct orientation to effect a hit.

An aileron control system, indicated schematically as comprising a pendulum control 204, an aileron amplifier 205, and an aileron servo 206, is incorporated in order to provide the correct angle of bank for the craft during operation of the rudder servo. This aileron control system may be exactly the same as is shown in Figs. 1 and 2.

The elevation error angle ($E_{error}$) voltage signal 196, 197 is also applied to the vertical deflecting plates 106 of cathode ray indicator tube 105, as by conductors 207, lead 208, switch 102 and lead 104. The azimuth error angle ($A_{error}$) voltage signal 198, 199 is similarly applied to the horizontal deflecting plates 107 of the cathode ray indicator tube 105, as by conductors 209, lead 210, switch 101 and lead 103, along with the oscillating voltage 120 from the range wings circuit 118.

Thus, as is illustrated in Fig. 6, the screen of the cathode ray indicator tube 105 will provide, during tracking operation, a continuous visual indication for the pilot of the elevation error angle ($E_{error}$), the azimuth error angle ($A_{error}$), and the approximate range ($D_0$) of the target. The dots 211, 211' and 211'' illustrate the azimuth error angles which would be successively indicated at the three stages in the solution shown in Fig. 3. In the final stage the dot is at the center, indicating that both the elevation error angle ($E_{error}$) and the azimuth error angle ($A_{error}$) are zero, and that a projectile fired at that time will effect a hit, provided only that the indicated range is within that of the guns being used. If this latter condition is met, the pilot may maintain his firing key closed, and the guns will be automatically caused to fire when both error angles are zero, by virtue of the automatic gun firing circuit, which will be presently described.

Obviously, if desired, the pilot may remove the craft from the control of the automatic pilot system by a suitable clutch or switch (not shown), and himself fly the craft in such a way as to bring the dot to the center.

In the previous discussion of the operation of the system of the present invention during search, it will be remembered that the scanner axis was maintained coincident with the craft axis through the control and follow-up system, and the craft was then oriented by the pilot so as to align both of these axes with the line of sight. It should be stressed that the coincidence of these three axes is not a necessary condition for initiating the tracking operation, it being sufficient that the scanner axis alone coincides with the line of sight.

Therefore, the system could be modified, if desired, by removing the scanner from the control of the control voltages 155 and 162, which normally operate, in search position, through the follow-up system, to maintain the scanner axis aligned with the craft axis, and instead to place the scanner axis directly under the manual control of the pilot, who could then align the scanner axis with the line of sight by positioning the scanner itself instead of the craft and the scanner.

However, the system as first described, with the scanner axis maintained coincident with the plane axis, and the plane being then positioned by the pilot into alignment with the line of sight is the preferred embodiment of the invention, since by flying the plane in the direction of the line of sight, the pilot himself performs the first approximation to the complete solution. This is clearly indicated from the angular relations illustrated in the first stage of Fig. 3 in which the elevation error angle ($E_{error}$) and azimuth error angle ($A_{error}$) are respectively equal to the elevation lead angle ($\Delta E$) and azimuth lead angle ($\Delta A$), both of which are normally small. The preferred system, therefore, performs the first approximation to the solution for the computing mechanism. Also, by preventing large error angle voltage signals from initially being fed to the automatic pilot system, shock on this system is reduced, and the possibility of the craft getting completely out of control by too rapid changes in attitude is prevented.

The details of a computing mechanism especially adapted for use in a fixed gun inter-aircraft fire control system are schematically shown in Fig. 4B.

In this computing mechanism the solution for the time of flight ($t_0$) is computed on the basis of the formula, $$t_0 = f(D_0) \times f(H) \times f(I.A.S.)$$

where $D_0$ represents the present range of the target, H the altitude of the craft, and I. A. S. the indicated air speed.

The pilot turns the altitude dial 212 until the fixed index 213 is opposite the correct altitude. The dial 212 is so graduated that the necessary rotation required to accomplish this is proportional to the logarithm of a predetermined function of the altitude (H). Thus, log $f(H)$ is set into the differential 215 through the shaft 214.

In a similar way log $f(I.A.S.)$ is set into a second differential 219 through shaft 218 by rotation of the indicated air speed dial 216 until the fixed index 217 reads the correct indicated air speed.

The range voltage signal 188 is conducted by conductors 220 to the range follow-up 221, which is of any suitable type adapted to produce an angular displacement of its output shaft 222 proportional to the input signal voltage 188. Shaft 222 rotates logarithmic cam 223, which is designed so as to produce a linear displacement of its follower 224 which is proportional to the logarithm of a predetermined function of its own angular displacement. The linear displacement of follower 224, which is therefore proportional to log $f(D_0)$, is converted to an angular displacement of shaft 226, as by rack 229 and pinion 225, and is then transmitted to the differential 215 through gearing 227 and shaft 228.

The differential 215 mechanically performs an addition of the rotation of input shaft 228 (log $f(D_0)$) and the rotation of the second input shaft 214 (log $f(H)$) and produces on its output shaft 230 a rotation proportional to their sum (log $f(D_0)$ + log $f(H)$). The second differential 219, in like maner, adds together the angular displacements of its two input shafts 230 and 218 and produces on its output shaft 231 an angular displacement proportional to their sum (log $f(D_0)$ + log $f(H)$ + log $f(I.A.S.)$)

Shaft 231 rotates a second logarithmic cam 232, which is adapted to produce a linear displacement of its follower 233 proportional to the antilogarithm of its own angular displacement. Thus, on the basis of the formula for ($t_0$) previously mentioned, it is apparent that the linear displacement of follower 233 is proportional to the time of flight ($t_0$). The linear displacement of follower 233 is converted to a proportional angular displacement of shaft 269 through the rack 234 and pinion 235. The shaft 236 then causes the contact arms 270 and 271 to be rotated on their respective potentiometer resistors 272 and 273 an angle proportional to time of flight ($t_0$).

The azimuth rate ($A_r$) voltage signal 173 is applied across the terminals of the azimuth potentiometer resistor 273, as by conductors 274 and 275. The voltage drop across the terminal tap 276 and the conductor 198, which is electrically connected to the contact arm 271, will therefore be proportional to both the azimuth rate ($A_r$) voltage signal 173 and the angular displacement of the contact arm 271. Thus, the voltage 198, 276 is proportional to the product of azimuth rate ($A_r$) and time of flight ($t_0$), and therefore is proportional to the azimuth lead angle ($\Delta A$).

This azimuth lead angle ($\Delta A$) voltage 198, 276 is placed in series with the present azimuth ($A_0$) voltage 187, the two voltages being thereby algebraically added together, to produce the azimuth error angle ($A_{error}$) voltage 198, 199, according to the formula, $$A_{error} = A_0 + \Delta A = A_0 + A_r \times t_0$$

The elevation error angle ($E_{error}$) voltage 196, 197 is obtained in a similar manner. Thus, the elevation rate ($E_r$) voltage 172 is applied across the terminals of the elevation potentiometer resistor 272, as by conductors 278 and 279. However, in this case a small constant direct voltage, such as the battery 280, is first inserted in series with one of the elevation rate voltage conductors 278. The battery voltage 280 is chosen so as to be proportional to the ratio of the superelevation correction ($\phi_s$) to the time of flight ($t_0$), which ratio is substantially constant. The actual voltage 281, 282 across the elevation potentiometer resistor 272 will, therefore, be proportional to the sum $$\left(E_r + \frac{\phi_s}{t_0}\right)$$

of the elevation rate ($E_r$) voltage 172 and the constant battery voltage 280

$$\left(\frac{\phi_s}{t_0}\right)$$

The voltage 196, 281 across the contact arm 270 and one terminal of the potentiometer resistor 272, being proportional both to the voltage 281, 282 and to the angular displacement of the contact arm 270, proportional to the product of $$\left(E_r + \frac{\phi_s}{t_0}\right)$$

and $t_0$, and is therefore proportional to the elevation lead angle ($\Delta E$), according to the formula, $$\left(E_r + \frac{\phi_s}{t_0}\right)t_0 = E_r t_0 + \phi_s = \Delta E$$

This voltage 196, 281, proportional to $\Delta E$, is then inserted in series with the present elevation ($E_0$) voltage 186, effecting an algebraic addition of the two, and producing the elevation error angle ($E_{error}$) voltage 196, 197, according to the formula, $$E_{error} = E_0 + \Delta E$$

In series with the leads 23, 24 to the gun firing circuit, there are shown two switches 285 and 286 which are under the control of the elevation relay 283 and the azimuth relay 284, respectively. The elevation relay 283 is energized by the elevation error angle ($E_{error}$) voltage 196, 197, so that switch 285 is allowed to close only when the elevation error angle is substantially zero. The azimuth relay 284 is similarly energized from the azimuth error angle ($A_{error}$) voltage 198, 199 so that switch 286 is allowed to close only when the azimuth error angle is substantially zero. In this way an automatic gun firing circuit 23, 24 is provided, which the pilot can only close when both elevation error angle ($E_{error}$) and azimuth error angle ($A_{error}$) are substantially zero, that is, when the craft (and the guns) have been correctly oriented to effect a hit on the target.

Figures 4A and 4B show one form of computer controlled by a stabilized sight, the output from the stabilized sight being the target rates $E_r$ and $A_r$ in elevation and azimuth, respectively, and E₀ and A₀, the angular position of the target in elevation and azimuth, respectively. These outputs are available from any stabilized line of sight defining device and could be used to actuate any other suitable computer such as that shown in the diagram of Fig. 1. If the stabilized sight is not of the radar type, where an accurate measure of range is usually available, the shaft 8 of Fig. 1 could be operated according to range obtained from any range finder. The output shafts 11 and 12 are shown as controlling directly the servos 15' and 15 for an automatic pilot. The altitude and indicated air speed handwheels 2 and 4 are well known in modern airborne sights to provide corrections in the ballistics for air speed, corrected for air density. That is, these handwheels supply a correction for ballistic wind on the projectiles due to the motion of the supporting aircraft. The effect of the wind varies according to air density, the air becoming less dense as the altitude increases. These corrections are introduced in various ways in the different types of computers and are well known to those skilled in the art.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic fire control system for a gun supported in a fixed position on an aircraft, target tracking means, a lead angle computing mechanism controlled thereby adapted to solve for the corrections to the orientation of the supporting aircraft necessary for effective gun fire, and automatic pilot means controlled according to said computed corrections for positioning the aircraft to the proper orientation for effective gun fire.

2. In an automatic fire control system for a gun supported in a fixed position on an aircraft, target tracking means, a lead angle computing mechanism controlled thereby adapted to solve for the corrections to the orientation of the supporting aircraft necessary for effective gun fire, in terms of elevation and azimuth, automatic pilot means for positioning the craft, and means controlled by the output of the computing mechanism for actuating said automatic pilot means in accordance with said computed corrections.

3. The apparatus described in claim 1, further including, a gun firing circuit, and automatic cut-out means under the control of the output of the computing mechanism according to said computed corrections for maintaining said firing circuit open except when said computed corrections are substantially zero.

4. The apparatus described in claim 1, further including, an electrical gun firing circuit, automatic switching means in said gun firing circuit adapted to close, when said computed corrections are substantially zero, and other switching means in said firing circuit under the manual control of the pilot effective to fire the guns on the closing of the first-mentioned switching means.

5. An automatic fire control system for a gun supported in a fixed position on an aircraft comprising sighting means for tracking a target in elevation and azimuth, computing means controlled by the sighting means during a tracking operation for computing the corrections to the orientation of the supporting aircraft necessary for directing effective gun fire at the target, and automatic steering means operated by the computing means for controlling the orientation of the supporting aircraft to position the gun in accordance with said computed corrections.

6. A fire control system for a gun supported in a fixed position on an aircraft comprising sighting means for tracking a target, lead angle computing means operated thereby for computing from target tracking operation the corrections to the orientation of the craft necessary for effective gun fire, and servo motor means actuated by the output of the computing means for controlling the orientation of the craft to position the gun in accordance with said computed corrections.

7. In a fire control system for a gun supported in a fixed position on an aircraft, target tracking means, a lead angle computing mechanism controlled thereby adapted to solve for the corrections to the orientation of the craft necessary to position the gun for effective gun fire, and means comprising a cathode ray tube controlled by the computing mechanism for providing an indication of said lead angle corrections for the pilot, whereby the pilot may manually position the craft to the correct orientation for effective gun fire.

8. Apparatus, as described in claim 7, wherein said indicating means also provides an indication of target range, whereby the pilot may know when the target is within gun range.

9. Apparatus, as described in claim 7, wherein said indicating means also provides an indication of target range, and further including, an electrical gun firing circuit, switching means in said gun firing circuit, and actuating means under the control of said computing mechanism for closing said switching means when said computed corrections are substantially zero.

10. An automatic fixed gun inter-aircraft fire control system comprising, a sight adapted to be rotated in elevation and azimuth, a free stabilizing gyro cooperating with said sight, means for controlling the orientation of said sight in accordance with the orientation of said gyro, means for producing control torques in accordance with the non-coincidence between the axis of said sight and the true line of sight to a target, means for controlling the orientation of said gyro from said control torques, computing means for computing the corrections to the orientation of the craft necessary for effective gun fire in terms of elevation and azimuth, means for providing target range input data for said computing means, means for transmitting target elevation and azimuth input data corresponding to the orientation of said sight to said computing mechanism, means for transmitting target elevation and azimuth stabilized rate input data corresponding to said control torques to said computing means, and automatic pilot means controlled by the output of the computing means for positioning the craft in accordance with said computed corrections.

11. An automatic fixed gun inter-aircraft fire control system, as defined in claim 10, further including, an electrical gun firing circuit, automatic switching means in said gun firing circuit, means for closing said switching means when said computed corrections are substantially zero, other switching means in said firing circuit under the manual control of the pilot, and means for providing an indication of target range for the pilot.

12. An automatic fixed gun inter-aircraft fire control system, as defined in claim 10, wherein said means for producing control torques includes integrating means adapted to allow the production of substantial control torques from substantially zero degrees of non-coincidence between the axis of said sight and the true line of sight to said target.

13. A fixed gun inter-aircraft fire control system, as defined in claim 10, further including means for providing an indication of target range and also of said computed corrections for the pilot, and switching means for releasing the craft from the control of said automatic pilot means, whereby the pilot may manually fly the craft to the orientation necessary for effective gun fire.

14. A fixed gun inter-aircraft fire control system comprising means including a scanner, rotatable in elevation and azimuth, for directing electromagnetic energy at a target for searching and tracking operations, means for receiving the corresponding reflected energy, a stabilizing free gyro associated with said scanner, means for controlling the orientation of said scanner from the orientation of said gyro, torque producing means for controlling the orientation of said gyro, switching means for selectively initiating either searching or tracking operations, means for placing said torque producing means under the control of the craft orientation during search, and under the control of the target position, as determined by the variations in said reflected energy during track, means for indicating the orientation of the line of sight to the target with respect to the craft during search, and computing means for computing, during track, the corrections to the orientation of the craft necessary for effective gun fire.

15. An automatic fixed gun inter-aircraft fire control system, as defined in claim 14, including further, automatic pilot means under the control of said computing means according to the computed corrections for positioning the craft at the orientation necessary for effective gun fire.

16. A fixed gun inter-aircraft fire control system, as defined in claim 14, including further, means for indicating the target range, and automatic pilot means under the control of said computing means for positioning the craft to the orientation necessary for effective gun fire.

17. A fixed gun inter-aircraft fire control system, as defined in claim 14, including further, visual means for indicating to the pilot during track the target range and also said computed corrections, whereby the pilot may manually orient the craft for effective gun fire.

18. A fire control system for a gun mounted in a fixed position on an airplane comprising a radar system for tracking a target, means controlled by the radar system for computing the lead angles for positioning the gun so that projectiles therefrom will strike the target, and steering means for the aircraft controlled jointly by the radar system and computing means for positioning the gun according to the computed lead angles.

19. A fire control system for a gun mounted in a fixed position on an airplane comprising a radar system for tracking a target, means included in the radar system for computing the lead angles necessary for positioning the gun so that projectiles therefrom will strike the target, indicating means in the radar system controlled by the computing means for constantly indicating the magnitude of the error of the position of the gun with respect to the computed lead angles in order that the plane may be guided to so position the gun that no error exists.

20. A fire control system for a gun mounted in a fixed position on an airplane comprising a radar system for tracking a target, means included in the radar system effective when tracking a target for computing the lead angles necessary for positioning the gun so that projectiles therefrom will strike the target, indicating means comprising a cathode ray tube included in the radar system and controlled by the computing means for constantly indicating the magnitude of the error of the position of the gun with respect to the computed lead angles in order that the progress of the plane may be observed as it is being guided to a position where no error exists in the position of the gun.

21. A fire control system for pursuit planes having an automatic pilot and a gun mounted in a fixed position on said plane, comprising a radar system for tracking the target, means controlled thereby for computing proper lead angles for the gun, and means controlled by said lead angle computing means and operating through said automatic pilot for steering the craft along such course as to cause the proper lead angles to be maintained by the fixed gun.

22. A fire control system for use against invisible targets for an aircraft having fixed guns which comprises a radar line of sight defining device movable with respect to the aircraft for target tracking purposes, a computer controlled by the line of sight defining device for computing constantly the lead angle at which the guns on the aircraft must be positioned for effective gun fire against the target, and means controlled by the output of the computer for indicating the relative positions of the target and aircraft, the positions being spaced in accordance with the offset of the aircraft from the computed lead angle.

23. A fire control system for use against invisible targets, for aircraft having fixed guns, which comprises a radar line of sight defining device movable with respect to the aircraft for target tracking purposes, a computer controlled by the line of sight defining device for computing constantly the position required for the aircraft in order that the guns fixed thereto may lead the target according to the lead angle required for effective gunfire, and means comprising a cathode ray indicator tube having circuits controlled by the line of sight defining device and by the output of the computer for indicating the position of the target with respect to the aircraft, the position indication varying according to the difference between the instantaneous position of the aircraft and that computed by the computer.

24. A fire control system adapted for use at night by an aircraft having fixed guns which comprises a radar target tracking device including a cathode ray indicator, a computer controlled by the radar device for computing the lead angle by which the guns must be offset from the radar line of sight for effective gunfire against the target being tracked, and circuit means for the cathode ray indicator controlled by the radar device and by the output of the computer effective to cause the indicator to indicate the present position of the aircraft with respect to that in which the guns are positioned according to the computed lead angle.

25. A fire control system adapted for use at night by an aircraft having fixed guns which comprises a radar target tracking device including a cathode ray indicator, a computer actuated by the tracking device according to range, the angular position of the target and rate of change thereof for computing lead angles for the guns, circuit means controlled by the output of the computer and by the tracking device for so controlling the cathode ray indicator that a constant indication is provided thereby of the present position of the target offset from a reference in accordance with the instantaneous magnitude of the computed lead angle.

26. A fire control system adapted for use at night by an aircraft having guns fixed parallel to the longitudinal axis thereof which comprises a radar target tracking device including a cathode ray indicator, a computer actuated by the tracking device according to range, the angular position of the target and rate of change thereof for computing lead angles for the guns, circuit means controlled by the output of the computer and by the tracking device for so controlling the cathode ray indicator as to obtain a constant indication of the present position of the target offset from a reference in accordance with the instantaneous magnitude of the computed lead angle whereby the aircraft may be flown to position the guns at the required lead angles whereupon the indication of the target will coincide with the reference.

27. A fire control system particularly adapted for use against invisible targets and in connection with aircraft having fixed longitudinally disposed guns which comprises a radar target tracking device including a cathode ray indicator having ray deflecting means, a computer actuated by the tracking device according to range, the angular position of the target and rate of change thereof for computing lead angles for the guns, circuit means connected with the ray deflecting means controlled by the output of the computer and by the tracking device for actuating the cathode ray tube to form an indication of the present position of the target offset from a reference, the offset being in accordance with the computed lead angle.

28. A fire control system particularly adapted for use against invisible targets and in connection with aircraft having fixed longitudinally disposed guns which comprises a radar target tracking device including a cathode ray indicator having ray deflecting means, a computer actuated by the tracking device according to range, the angular position of the target with reference to the aircraft and the rate of change thereof for computing lead angles for the guns, circuit means connected with the ray deflecting means controlled by the output of the computer and by the tracking device for actuating the cathode ray tube to form an indication of the present position of the target offset from a reference according to the computed lead angle, and automatic pilot means controlled by the circuit means for guiding the aircraft to a position wherein the guns thereon are positioned according to the computed lead angle.

EDMUND B. HAMMOND, JR.
GIFFORD E. WHITE.

REFERENCES CITED

The following references are of record in the file of this patent:

UNITED STATES PATENTS

| Number | Name | Date |
|---|---|---|
| 1,799,088 | Caproni | Mar. 31, 1931 |
| 1,384,005 | Akemann | July 5, 1921 |
| 1,401,028 | Akemann | Dec. 20, 1921 |
| 2,235,826 | Chaffee | Mar. 25, 1941 |
| 1,930,481 | Kruger | Oct. 17, 1933 |
| 1,939,675 | Ely | Dec. 19, 1933 |
| 2,176,469 | Moueix | Oct. 17, 1939 |
| 1,303,105 | Murdock | May 6, 1919 |
| 2,231,929 | Lyman | Feb. 18, 1941 |
| 2,339,521 | Ross | Jan. 18, 1944 |
| 2,105,985 | Papello | Jan. 18, 1938 |
| 2,237,193 | Mobsby | Apr. 1, 1941 |

FOREIGN PATENTS

| Number | Country | Date |
|---|---|---|
| 248,601 | Germany | June 25, 1912 |
| 501,996 | Great Britain | Mar. 9, 1939 |
| 352,035 | Great Britain | June 22, 1931 |
| 667,335 | France | June 10, 1929 |
| 764,537 | France | Mar. 5, 1934 |
| 834,151 | France | Apr. 8, 1938 |